Patented Oct. 15, 1940

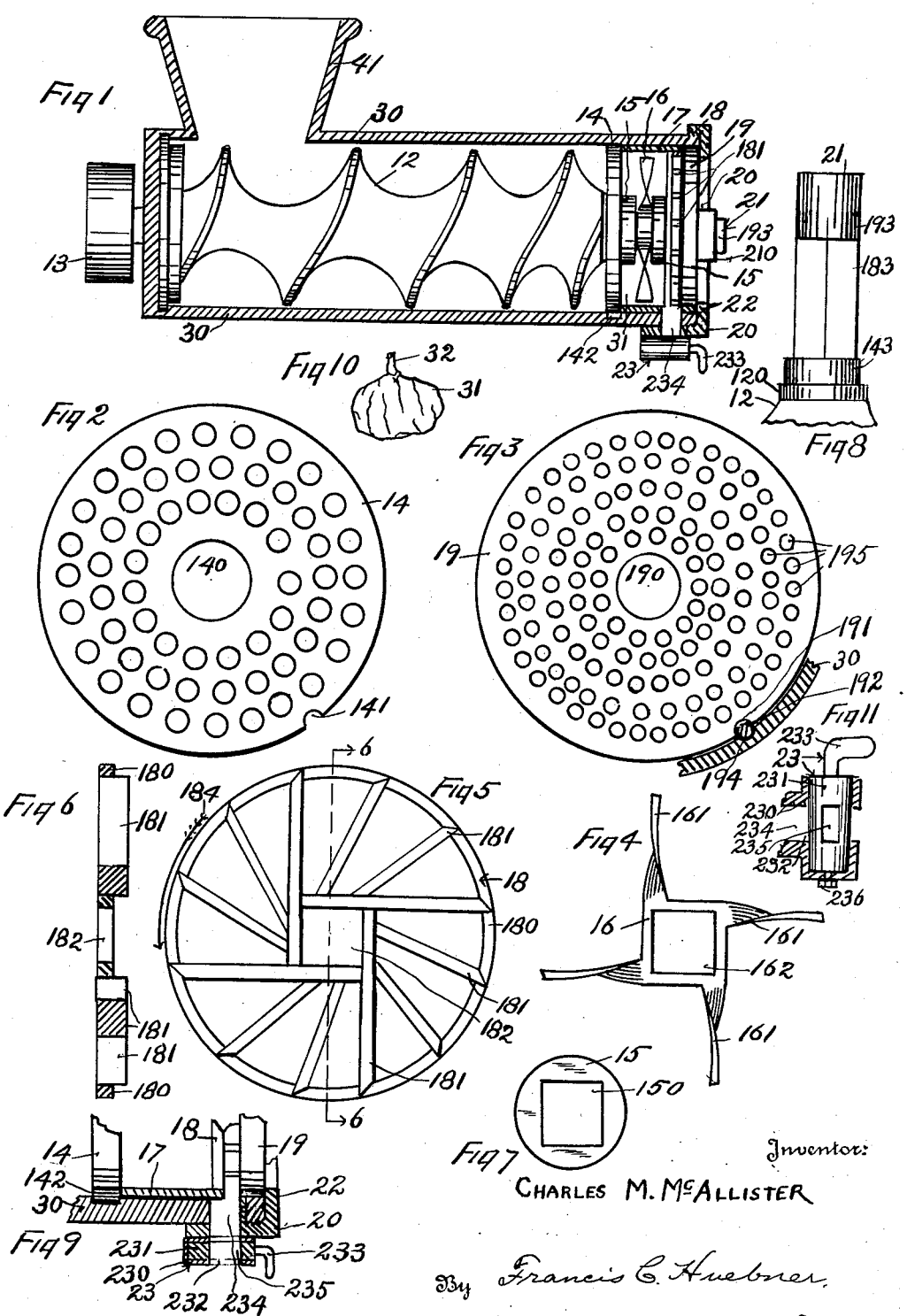

2,218,119

UNITED STATES PATENT OFFICE 2,218,119

FOOD CRUSHER

Charles M. McAllister, Fresno, Calif.

Application September 18, 1939, Serial No. 295,367

5 Claims. (Cl. 146—189)

My invention relates to a device for crushing fruit, either fresh or dried, thus reducing it to a pulp or paste for commercial use, and more particularly, my invention is adapted for removal, during the process of crushing the fruit, of foreign particles, or portions of the fruit which remain hard and do not readily disintegrate, which foreign and hard particles would otherwise be a detriment to a smooth paste. My invention is especially valuable for the removal from the paste formed of dried figs, of the hard cap stems which are normally on the dried figs, and which in present day manufacture of fig paste is inseparably included in the commercial paste.

The object of my invention is the creation of a device which will grind, or crush fruits, especially dried figs, into a pulp or paste, and during the process the hard stems, or other hard substances not readily disintegrated will be separated from the conglomerate mass and removed therefrom. Other objects will be disclosed in the following specification.

In the drawing accompanying this specification, and hereby made a part hereof,

Fig. 1 is a side view of the completed food crusher having the housing shown in section so that the interior of the crusher can be seen.

Fig. 2 is a face view of a perforated plate.

Fig. 3 is a face view of a perforated plate having smaller perforations than those shown in Fig. 2.

Fig. 4 shows an agitator for creating a movement of the paste after it has passed through the first perforated plate, and before being subject to the elements intended to remove the hard particles from the mass.

Fig. 5 is a plurality of knives adapted to be revolved over the face of a perforated plate.

Fig. 6 is a cross sectional view of the knife along broken line 6—6 in Figure 5.

Fig. 7 is a face view of a spacer.

Fig. 8 is a fractional view of an end of the axle carrying the screw propeller, indicating the portions of said axle which is adapted to rotate within the perforated plates shown in Figs. 2 and 3, and the portion of the axle that carries with it the plurality of knives, the agitator, and the spacers shown in Figs. 4, 5, and 7.

Fig. 9 is an enlarged sectional view of a portion of the housing shown in Fig. 1, showing the by-pass through the housing for the passage of the hard stems and foreign hard particles, and means for regulating said opening, said figure showing the by-pass mechanism in section and fully opened.

Fig. 10 shows a normal fig to illustrate the hard stem which is sought to be removed from the mass when the fig is reduced to a paste.

Fig. 11 is an enlarged view of the means for regulating the by-pass opening, this figure being partly in section and showing the by-pass closed.

It is further noted that Figs. 2, 3, 4, 5, 6, 7, 8, 9 and 11 are all enlarged as compared with similar parts shown in Fig. 1.

Referring to the drawing, I have provided a tubular housing 30, having at one end a hopper 41 for the purpose of introducing the food to be crushed into the crusher. Within the housing 30 is a screw propeller 12 which is adapted when the screw is rotated to force the food placed therein to the end of the housing opposite to hopper 41. I have shown a pulley 13 which is adapted when power, not shown, is applied thereto to rotate screw 12. It is noted that the screw may be turned with a crank not shown by hand, or it can be directly connected with an electrical motor, not shown. The means for turning the screw is not within the scope of my invention.

The end of axle 21, opposite to the end supporting pulley 13, is shown more in detail in Fig. 8, and comprises a bearing 143, which cooperates with the hole 140 in perforated plate 14 shown enlarged in Fig. 2. Said axle 21 has a square shank 183 adjacent to bearing 143, and is adapted to have interlocked therewith spacers 15, having square hole 150 therein, agitator 16, having square hole 162 therein, shown in Fig. 4, and cutting blades assembly 18, having a square hole 182 therein, shown in Fig. 5. While I have shown shank 183 as square, it can be of any desired shape which will permit the cutting blade assembly, the agitator, and the spacers to be interlocked therewith. The end of axle 21 adjacent to shank 183 is formed into a bearing 193 for the purpose of cooperating within the bearing hole 190 in perforated plate 19, shown in Fig. 3. Fig. 3 shows the face of perforated plate 19 which is adjacent to the cutter assembly 18. On the opposite face of said plate it is noted in Fig. 1 that said opening 190 has a hub extension 210, through which the bearing 193 passes and is supported.

It is noted that the perforated plates 14 and 19 are circular in form and are adapted to fit snugly within housing 30. Plate 14 is anchored to the housing by means of a key 142 attached to the housing, which key engages notch 141 in plate 14. Similar means is used to anchor perforated plate 19 to the housing, the notch in the plate being shown as 191, the key 192, and the cooperating notch in the housing 30 being designated 194. A thrust bearing 120 is at the end of screw 12 adjacent to perforated plate 14, and is adapted to assist in holding plate 14 in position to properly function. Between plates 14 and 19 is a bushing 17 which acts as a spacer between plates 14 and 19. As shown in the drawing, plates 14 and 19 abut against the ends of said bushing 17, forming a chamber 31.

When the device is assembled, we have the following elements between plates 14 and 19: Adjacent to the face of perforated plate 14 is a bushing 15, interlocked with shank 183 as hereinbefore described, then the agitator 16, then another spacer 15, and the cutter assembly 18 which is adjacent to the face of perforated plate 19. The said spacers, the agitator and the cutter assembly are all anchored to shank 183 as heretofore described, and therefore rotate with it. The agitator 16 consists of a plurality of paddles 161 which in the rotation of the screw assist in disintegrating, crushing and mixing into a paste the figs or other product which it is desired to reduce to a pulp. The cutter assembly consists of a plurality of knives 181 shown in Figs. 5 and 6, which are arranged approximately tangently. They are supported on the inside end by being attached to a square hub 182, said hub being adapted to fit snugly on shank 183, and on the outer ends are attached to an annular support 180. As shown in Fig. 6 the annular support is of less thickness than the width of blades 181 so that there is a free space aligned with the annular ring between the outside ends of the knives. The cutter assembly 18 is assembled with perforated plate 19 so that the blades will drag adjacent to the face of said plate 19, and the free space at the ends of knives 181 is between annular ring 180 and plate 19. Registering with said free space is an opening 234 through bushing 17 and housing 30. It will be noted that the perforations in plate 14 are larger than in plate 19. When the device is in use, the figs 31 (see Fig. 10) and the hard stem 32 will be forced through the perforations of plate 14 and will form a coarse paste with the hard stems and other foreign hard substances passing through perforations in plate 14 mixed with the paste. The rotation of agitator 16 assists in reducing the coarse texture of the paste which has entered the chamber between plates 14 and 19. As the screw continues to force the coarse paste into the chamber between the perforated plates, the means of escape of the paste from said chamber is through the smaller perforations in plate 19. The rotation of cutter assembly 18 assists in keeping the face of plate 19 clean, and the hard particles which do not readily pass through the smaller apertures or perforations are forced by the tangentially arranged knives toward the outer periphery of the plate. The direction of the rotation of the cutter assembly is clockwise, and shown by arrow 184 adjacent to Fig. 5. When these hard particles reach the opening 234 through bushing 17 and housing 30, they are normally crowded into said opening, and thus do not pass through the perforations 195 in plate 19, thus being separated from the softer pulp which has passed through said perforations.

It is noted that if said by-pass 234 was open in full as shown in Fig. 9 of the drawing, large quantities of the softer paste would pass through said by-pass. I have discovered that by regulating the size of said by-pass to accord with the amount of fruit fed into the hopper, the pressure inside of chamber 31 within the housing 30 and between plates 14 and 19 can be regulated, which in turn will assist in forcing the soft and finely mascerated pulp through the perforations 195, thus permitting the hard stems and hard foreign particles to rest on the face of the plate until wiped therefrom by the movement of the knives and cutter assembly. In my experiments I have diminished the amount of soft pulp escaping from said by-pass 234 to a negligible quantity. I accomplish this adjustment by means of a commonly known stop cock 23 which is adapted for my purpose. As shown in Figs. 9 and 11 it consists of a core 231 which can be in the shape of the frustum of a cone, having a transverse opening 235 therethrough. This core is fitted within a housing 230 also having a transverse opening 232. By means of a handle 233 attached to said core the core can be moved so that the opening 234 will register with opening 232, and, by moving the core to selective positions, the openings in the core and the housing combined and be any size between the full opening shown in Fig. 9 and the closed status shown in Fig. 11.

Plate 19 is held in assembled relation with the other elements hereinbefore described by means of an annular screw cap 20 having an inside flange 22 as shown in Fig. 1.

It is noted that I have formed the knife blades narrow, the object being to have a plurality of them with a minimum obstruction of the perforations in the plate over which it passes.

My device will work with a lesser degree of perfection if the plate containing the larger holes, and the agitator are eliminated from the combination, especially if the fruit has theretofore been reduced to pulp or semi-pulp, or is soft, and the knife assembly and by-pass will perform the functions claimed as my invention. The knife assembly will also function with the omission of the annular ring which strengthens the assembly. Hence I claim as my invention and desire protection on the device described independent of these modifications.

Having described my invention I claim:

1. In a device for reducing dried figs and other fruits to a paste, the combination of a housing, two perforated plates within the housing spaced apart, the outer plate having smaller perforations than the inner plate, means for anchoring the plates to the housing, means for forcing figs placed within said housing through the perforations of said plates, a rotary knife assembly adapted as a scraper consisting of a plurality of blades arranged approximately tangently on a centrally located hub, an annular ring attached to said blades concentric with the hub, and adjacent to the outer ends of the blades, said blades being wider than the thickness of the ring and arranged thereon to permit a free open space between the ends of adjacent blades, said rotary knife being positioned in the space between the perforated plates, concentric therewith, adjacent to the inside face of the outer plate, and with a spaced distance between the inside face of the outer plate and the annular ring, means for rotating the rotary knife, and a by-pass through the housing aligned with the space between the annular ring and the outer perforated plate, said by-pass being adjustable as to its size.

2. A device described in claim 1 having an agitator within the chamber between the two perforated plates, and means for rotating said agitator.

3. In a device for reducing fruit to a pulp or paste, and for removing hard particles from said paste, a housing, said housing having a cylindrical chamber therein, said housing having an opening therethrough adapted to feed fruit into the cylindrical chamber, a perforated plate anchored to the housing over one end of the cylindrical chamber, means for forcing fruit toward and through said perforated plate, a second perforated plate attached to the housing within the cylindrical chamber on an approximately parallel plane with said end perforated plate, and a spaced distance therefrom, the end perforated plate having smaller apertures than the interior perforated plate, a knife, or scraper consisting of a plurality of blades attached tangently to the hub, and positioned so said blades rotatingly pass over the inside face of the end perforated plate, the direction of the rotation of said blades adapting the outside ends of the blades to be behind the hub end of the blade in its path of travel when rotating, means for rotating the scraper blades, and a by-pass through the housing in line with the path of the rotating scraper.

4. In a device for separating hard cap stems of figs from a fig paste, the combination of a housing having an intake end and a discharge end, a perforated end plate adapted to close the discharge end of the housing, said end perforated plate being anchored to the housing, a second plate having larger perforations than said end plate being anchored to the housing, within the housing, and on a plane approximately parallel with the plane of the face of the end plate, and in line with the path of travel of the figs from the intake to the outlet in said housing, an agitator adapted to be rotated within the housing and between said two perforated plates, said agitator consisting of a center hub and radial extensions therefrom, each of said radial extensions being spiral in form, a scraper consisting of a plurality of narrow blades adapted to be rotated over the inside face of the end perforated plate, and a by-pass through the wall of the housing aligned with the path of travel of the scraper.

5. A device described in claim 4 in which the by-pass through the wall of the housing can be regulated as to size.

CHAS. M. McALLISTER.